3,133,884
COATING COMPOSITION CONTAINING A LIQUID PHOSPHATE ESTER, A THERMOPLASTIC RESIN AND A SILICEOUS MATERIAL
Paul R. Graham, Richmond Heights, and Joseph R. Darby, Webster Groves, Mo., assignors to Monsanto Chemical Company, St. Louis, Mo., a corporation of Delaware
No Drawing. Filed Aug. 22, 1960, Ser. No. 50,832
15 Claims. (Cl. 252—88)

This invention relates to new and useful coating compositions which are particularly suitable for coating the strands of fibers of air filters.

In accordance with this invention it has been found that a composition comprising a major proportion of a liquid phosphate ester, and a minor proportion of a thermoplastic resin, and minor proportions of certain siliceous materials is especially useful as a dust collecting medium when applied to the strands or fibers of an air filter. It has been further found that when the composition of this invention is applied to the strands or fibers of an air filter a stable continuous tacky surface results which substantially increases the useful life of the filter.

It will be appreciated by those skilled in the art that the choice and amount of the various components of the compositions of the invention will be subject to adjustment and correlation, and thusly, will depend upon the use for which the composition is intended and the result desired.

In general the coating compositions of this invention contain from about 50 to about 99 parts by weight of liquid phosphate ester, from about 0.5 to about 35 parts by weight of thermoplastic resin and from about 0.5 to about 15 parts by weight of certain siliceous materials and preferably from about 80 to about 98 parts by weight of liquid phosphate ester to which is mixed 1.5 to 10 parts by weight of a thermoplastic resin and 0.5 to 10 parts by weight of certain siliceous materials.

The liquid phosphate esters which are useful in the practice of this invention are the liquid neutral phosphate esters which are used as plasticizers for vinyl chloride homopolymers and copolymers and are well known to those skilled in the art; e.g., the liquid alkyl diaryl phosphates, the liquid triaryl phosphates and the liquid di-alkyl aryl phosphates. The aryl groups in the esters can contain from 6 to 20 carbon atoms and the alkyl groups from 1 to 20 carbon atoms. In the triaryl phosphates and the alkyl diaryl phosphates, the aryl groups can be the same or different aryl groups, preferably they are the same aryl groups and contain from 6 to 12 carbon atoms. In the dialkyl monaryl phosphates, the alkyl groups can be the same or different alkyl groups, preferably the two groups contain a total of at least seven carbon atoms. As illustrative of the phosphate esters suitable for use in this invention are, methyl diphenyl phosphate, cetyl phenyl cresyl phosphate, 2-ethylhexyl diphenyl phosphate, octyl dicresyl phosphate, dodecyl dicresyl phosphate, 2-ethylhexyl di(tert.-butylphenyl) phosphate, cresyl diphenyl phosphate, phenyl dicresyl phosphate, tricresyl phosphate, 2-ethylhexyl butyl phenyl phosphate, decyl isoamyl cresyl phosphate, methyl cetyl phenyl phosphate, dibutyl phenyl phosphate, dibutyl naphthyl phosphate, octyl butyl phenyl phosphate. Especially preferred liquid phosphate esters for use in this invention are tricresyl phosphate and cresyl diphenyl phosphate.

The thermoplastic resins which can be employed in the compositions of this invention may be selected from a wide variety of polymers, such as polyvinyl acetate, vinyl halide polymers, alkyl acrylate polymers and alkyl methacrylate polymers.

A particularly preferred resin of the above group for use in this invention is polyvinyl acetate having an intrinsic viscosity from about 0.1 to about 0.8 (determined in cyclohexanone at 20° C.).

The term "methacrylate polymer" as used herein is meant to include homopolymers and copolymers of alkyl methacrylates wherein the alkyl group contains from one to eighteen carbon atoms and copolymers thereof with up to 25% by weight of another material copolymerizable therewith, for example, acrylic acid, methacrylic acid, alkyl acrylates wherein the alkyl group contains one to four carbon atoms, vinyl acetate, acrylonitrile, and styrene.

The term "acrylate polymer" as used herein is meant to include homopolymers and copolymers of alkyl acrylates in which the alkyl group contains from one to eight carbon atoms and copolymers thereof with, for example, up to 25% by weight of another material copolymerizable therewith, for example, acrylic acid, methacrylic acid, alkyl methacrylate esters, wherein the alkyl groups contain 2 to 4 carbon atoms, vinyl acetate, acrylonitrile, and styrene.

A preferred polymer of the above-mentioned group which has been found to give satisfactory results is polymethyl methacrylate.

The "vinyl halide polymers" of this invention are those homopolymers of vinyl compounds such as vinyl chloride, vinyl bromide, vinyl fluoride, and vinyl iodide and copolymers of such vinyl compounds with other ethylenically unsaturated materials copolymerizable therewith, for example, as vinylidene chloride; vinyl esters of carboxylic acids, such as, vinyl acetate, vinyl propionate, vinyl butyrate, vinyl benzoate; esters of unsaturated acids, such as methyl acrylate, ethyl acrylate, propyl acrylate, butyl acrylate, and the corresponding esters of methacrylic acid; vinyl aromatic compounds, such as styrene, orthochlorostyrene, para - chlorostyrene, 2,5 - dichlorostyrene, 2,4-dichlorostyrene, paraethyl styrene, di-vinyl benzene, vinyl naphthalene, α-methyl styrene; dienes such as butadiene, chlorobutadiene, unsaturated amides, such as acrylic acid amide, acrylic acid anilide; unsaturated nitriles, such as acrylic acid nitrile; esters of α,β-unsaturated carboxylic acids, such as, the methyl, ethyl propyl, butyl, amyl, hexyl, heptyl, octyl, allyl, methallyl, and phenyl esters of maleic, crotonic, itaconic, fumaric acids and the like. The class of copolymers in which a predominant proportion, i.e. more than 50% by weight of the monomer units are vinyl halide units, any balance being monomer units derived from an ethylenically unsaturated comonomer, represents a preferred class of resins to be in the compositions of this invention. Polyvinyl chloride and copolymers containing more than 80% of vinyl chloride monomer units are especially preferred, particularly a solution grade polyvinyl chloride.

Such solution grade resins and their preparation are well known to the art. They are usually prepared in a solution-type polymerization process which results in a low molecular weight polymer.

Preferably solution grade resins are employed in this invention, but are not essential since resins made by dispersion, bulk and suspension-type polymerization processes can be used but are found to be difficult to handle. Those skilled in the art will be in a position to choose the particular resin to meet specific conditions and circumstances under which the compositions are to be employed, e.g. as coating compositions, plastisol dispersants and sealing compositions.

The siliceous materials which can be employed in the composition of this invention may be selected from a wide variety of naturally occurring and synthetic siliceous materials, such as synthetic silicas and silicates, and naturally occurring silicate clays e.g., kaolinite and montmorillonite clays.

The "synthetic silicon oxides" are the synthetic silicas such as the precipitated silicas, fume silicas, and silica aerogels. The preparation of these synthetic silicas are well known to the art, for example, the precipitated silicas are described in U.S. Patent 2,496,736, issued to William T. Malony, fume silicas are described in U.S. Patent 2,886,414, issued to R.N. Secord, and silica aerogels are described in U.S. Patent 2,093,454, issued to Samuel S. Kistler.

A fume silica having a specific surface area of 100 to 500 square meters per gram and an aggregate particle size below 15 microns is a preferred siliceous material in the compositions of this invention.

The term "synthetic silicates" is meant to include the synthetic barium, calcium and magnesium silicates. A preferred synthetic metal silicate which has been found to give satisfactory results is calcium silicate prepared by a hydrothermal reaction of diatomite and lime. This synthetic calcium silicate is sold by Johns-Mansville under the designation of "Micro-Cel."

The naturally occurring silicate clays such as kaolinite clays and montmorillonite clays are described in "The Colloid Chemistry of the Silicate Minerals," Academic Press, New York, 1949 by C. E. Marshall, and include kaolin, talc, fuller's earth, bentonite and many others.

A preferred silicate clay of the above group for use in this invention is kaolin.

The compositions of this invention can be prepared by simply mixing the liquid phosphate ester, thermoplastic resin, and siliceous material and heating until solution results. However, gellation of the composition is difficult to control under these conditions.

A preferred method of preparing these compositions, as set forth in Table I, below comprises mixing a liquid phosphate ester with the indicated substances in the amounts set forth. The liquid phosphate ester is heated to 120° C. The thermoplastic resin is added slowly with agitation until solution takes place, during which time the temperature is maintained at 120±5° C. After the batch is cooled to 75° C., the siliceous material is added with vigorous stirring. The batch is allowed to cool to room temperature. The viscosity is measured after two hours.

Table I

| [Composition | A | B | C | D |
|---|---|---|---|---|
| Tricresyl phosphate | 91 | | | 92 |
| Cresyl diphenyl phosphate | | 91 | | |
| 2-ethylhexyl diphenyl phosphate | | | 91 | |
| Polyvinyl acetate [1] | 5 | 5 | 5 | 5 |
| Fume silica | 4 | 4 | 4 | 3 |

[1] Intrinsic viscosity 0.11 (polymer sold by Bakelite Company under the trade name "AYAC").

The viscosities of the compositions set forth above at 23° C. are obtained on a Brookfield Model HAT viscometer using a No. 5 spindle. The viscosity in centipoises of the various compositions is set forth in Table II below.

Table II

| R.p.m. | Composition | | | |
|---|---|---|---|---|
|  | A | B | C | D |
| 2.5 | 29,760 | 25,600 | 18,800 | 52,160 |
| 5 | 18,720 | 17,920 | 10,080 | 28,160 |
| 10 | 12,000 | 11,120 | 5,600 | 15,760 |
| 20 | 7,160 | 6,600 | 3,280 | 9,120 |
| 50 | 4,690 | 3,520 | 1,690 | 4,640 |
| 100 | 3,384 | 2,150 | 1,040 | 2,840 |
| Yield Value, dyne/cm.[2] | 552 | 384 | 440 | 1,200 |

Compositions A, B, C and D in Table I produce a highly tacky surface and have excellent thixotropic flow properties.

Similar results to the foregoing are obtained upon replacing the fume silica with precipitated silica, silica aerogel synthetic calcium silicate, kaolin, bentonite, or talc, and replacing the polyvinyl acetate with polymethyl methacrylate (viscosity at 30° C., 40% solids in toluol, 480–640 centipoises) or polyvinyl chloride.

Compositions prepared with (1) the liquid phosphate ester and thermoplastic resin without the siliceous material, and (2) the liquid phosphate ester and siliceous material without the thermoplastic resin are shown in Table III.

Table III

| Composition | A | B | C | D |
|---|---|---|---|---|
| Tricresyl phosphate | 94 | 90 | 90 | 90 |
| Polyvinyl acetate [1] | | | 10 | |
| Polymethyl methacrylate [2] | | 10 | | |
| Polyvinyl chloride | 6 | | | |
| Fume silica | | | | 10 |

[1] Intrinsic viscosity 0.11 (polymer sold by Bakelite Company under the trade name "AYAC").
[2] Viscosity at 30° C., 40% solids in toluol, 480–640 centipoises.

The viscosities of the compositions set forth above at 23° C. are obtained on a Brookfield Model HAT viscometer using a No. 5 spindle. The viscosities in centipoises of the various compositions are set forth in Table IV below.

Table IV

| R.p.m. | Composition | | | |
|---|---|---|---|---|
|  | A | B | C | D |
| 2.5 | 4,000 | 1,920 | 4,000 | 27,200 |
| 5 | 2,800 | 1,600 | 4,000 | 20,800 |
| 10 | 2,400 | 1,600 | 3,880 | 17,000 |
| 20 | 2,100 | 1,570 | 3,840 | 11,000 |
| 50 | 1,960 | 1,540 | 3,880 | 7,000 |
| 100 | 1,920 | 1,480 | 3,820 | |
| Yield Value, dyne/cm.[2] | 60 | 16 | 0 | 256 |

Results similar to those obtained with compositions A, B, C and D of Table I are obtained when the following copolymers are used in place of the polyvinyl acetate of these compositions:

Copolymers produced from a mixture of:

(1) 75% methyl methyl methacrylate and 25% butyl acrylate
(2) 85% methyl methacrylate and 15% methyl acrylate
(3) 75% methyl methacrylate and 25% vinyl acetate
(4) 85% methyl methacrylate and 15% acrylonitrile
(5) 80% methyl acrylate and 20% vinyl acetate
(6) 85% methyl acrylate and 15% methyl methacrylate
(7) 85% vinyl chloride and 15% vinyl acetate
(8) 80% vinyl chloride and 20% vinylidene chloride
(9) 90% vinyl chloride and 10% methyl acrylate
(10) 80% vinyl chloride and 20% ethyl methacrylate From the foregoing results it is evident that the compositions of this invention as illustrated by compositions set forth in Tables I and II have the necessary low viscosity values at high shear, high viscosity values at low shear, and yield values to permit high speed spraying and at the same time remain resistent to flow after being applied to the filter.

While this invention has been described with respect to certain embodiments it is not so limited and it is to be understood that variations and modifications thereof may be made which are obvious to those skilled in the art without departing from the spirit or scope of this invention.

The embodiments of the invention in which an exclusive property or privilege is claimed are defined as follows:

1. A liquid composition which provides a stable continuous tacky surface comprising from about 80 to about 98 percent by weight of a liquid phosphate ester, from about 1.5 to about 10 percent by weight of a thermoplastic resin being selected from the group consisting of a vinyl acetate polymer, a solution grade vinyl halide polymer, a methacrylate polymer and an acrylate polymer and from about 0.5 to about 10 percent by weight of a siliceous material selected from the group consisting of synthetic silicas selected from the group consisting of precipitated silica, fume silica, and silica aerogel; synthetic silicates selected from the group consisting of barium silicate, calcium silicate and magnesium silicate; and naturally occurring silicate clays selected from the group consisting of kaolinite clays and montmorillonite clays.

2. A composition of claim 1 wherein the siliceous material is fume silica having a specific surface area of from 100 to 500 square meters per gram and an aggregate particle size below 15 microns.

3. A composition of claim 1 wherein the siliceous material is silica aerogel having a specific surface area of from 100 to 500 square meters per gram and an aggregate particle size below 15 microns.

4. A composition of claim 1 wherein the siliceous material is calcium silicate having a specific surface area of from 100 to 500 square meters per gram and an aggregate particle size below 15 microns.

5. A composition of claim 1 wherein the liquid phosphate ester is tricresyl phosphate.

6. A composition of claim 1 wherein the liquid phosphate ester is cresyl diphenyl phosphate.

7. A composition of claim 1 wherein the liquid phosphate ester is 2-ethylhexyl diphenyl phosphate.

8. A composition of claim 1 wherein the thermoplastic resin is polyvinyl acetate having an intrinsic viscosity from about 0.1 to about 0.8.

9. A composition of claim 1 wherein the thermoplastic resin is a solution grade vinyl halide polymer in which at least 80% of the monomer units are vinyl halide units.

10. A composition of claim 3 wherein the thermoplastic resin is polymethyl methacrylate.

11. A liquid composition comprising from about 90 to about 95 percent by weight of tricresyl phosphate, from about 8 to about 1 percent by weight of polyvinyl acetate having an intrinsic viscosity of about 0.1 to about 0.3, and from about 2 to about 4 percent by weight of silica having a specific surface area of from 100 to 500 square meters per gram and an aggregate particle size below 15 microns.

12. A liquid composition comprising from about 90 to about 95 percent by weight of tricresyl phosphate, from about 8 to about 1 percent by weight of polymethyl methacrylate, and from about 2 to about 4 percent by weight of fume silica having a specific surface area of from 100 to 500 square meters per gram and an aggregate particle size below 15 microns.

13. A liquid composition comprising from about 90 to about 95 percent by weight of tricresyl phosphate, from about 8 to about 1 percent by weight of a solution grade polyvinyl chloride, and from about 2 to about 4 percent by weight of fume silica having a specific surface area of from 100 to 500 square meters per gram and an aggregate particle size below 15 microns.

14. A liquid composition comprising from about 90 to about 95 percent by weight of tricresyl phosphate, from about 8 to about 1 percent by weight of polyvinyl acetate having an intrinsic viscosity of about 0.1 to about 0.3, and from about 2 to about 4 percent by weight of silica aerogel having a specific surface area of from 100 to 500 square meters per gram and an aggregate particle size below 15 microns.

15. A liquid composition comprising from about 90 to about 95 percent by weight of tricresyl phosphate, from about 8 to about 1 percent by weight of polymethyl methacrylate, and from about 2 to about 4 percent by weight of silica aerogel having a specific surface area of from 100 to 500 square meters per gram and an aggregate particle size below 15 microns.

References Cited in the file of this patent

UNITED STATES PATENTS

| | | |
|---|---|---|
| 2,327,128 | Renfrew et al. | Aug. 17, 1943 |
| 2,616,418 | Eberl | Nov. 4, 1952 |
| 2,647,296 | Shive | Aug. 4, 1953 |
| 2,753,314 | Severs et al. | July 3, 1956 |
| 2,756,219 | Plas et al. | July 24, 1956 |
| 2,860,382 | Garrett | Nov. 18, 1958 |
| 2,980,643 | Edelman | Apr. 18, 1961 |